US012149606B2

(12) United States Patent
Honorio Araujo da Silva et al.

(10) Patent No.: US 12,149,606 B2
(45) Date of Patent: Nov. 19, 2024

(54) METHODS AND SYSTEMS FOR ENCRYPTING RATIONAL NUMBERS AND ADDING RANDOMNESS TO RSA CRYPTOSYSTEMS USING P-ADIC NUMBERS

(71) Applicant: Algemetric, Inc., Colorado Springs, CO (US)

(72) Inventors: David W. Honorio Araujo da Silva, Colorado Springs, CO (US); Carlos A. Paz de Araujo, Colorado Springs, CO (US); Jordan Isabella Pattee, Colorado Springs, CO (US)

(73) Assignee: Algemetric, Inc., Colorado Springs, CO (US)

( * ) Notice: Subject to any disclaimer, the term of this patent is extended or adjusted under 35 U.S.C. 154(b) by 260 days.

(21) Appl. No.: 17/891,926

(22) Filed: Aug. 19, 2022

(65) Prior Publication Data

US 2022/0407719 A1    Dec. 22, 2022

Related U.S. Application Data

(63) Continuation of application No. PCT/US2021/050988, filed on Sep. 17, 2021.
(Continued)

(51) Int. Cl.
*H04L 9/00* (2022.01)
*H04L 9/30* (2006.01)
(Continued)

(52) U.S. Cl.
CPC ............ *H04L 9/008* (2013.01); *H04L 9/30* (2013.01); *H04L 9/3033* (2013.01);
(Continued)

(58) Field of Classification Search
None
See application file for complete search history.

(56) References Cited

U.S. PATENT DOCUMENTS 5,910,117 A * 6/1999 Basoglu ............... A61B 8/488
                                                      600/455
2002/0141593 A1* 10/2002 Kurn ....................... H04L 9/085
                                                      380/286
(Continued)

FOREIGN PATENT DOCUMENTS

JP         H1039751 A   *  2/1998
JP         2000298501 A  * 10/2000
(Continued)

OTHER PUBLICATIONS

David W. H. A. da Silva, Carlos Paz de Araujo, and Edward Chow; (An Efficient Homomorphic Data Encoding with Multiple Secret Hensel Codes); pp. 11; Published in Mar. 2020.*
(Continued)

*Primary Examiner* — Eleni A Shiferaw
*Assistant Examiner* — Ali H. Cheema
(74) *Attorney, Agent, or Firm* — Christopher P. Whitham; Cochran Freund & Young LLC

(57) ABSTRACT

Disclosed are methods and systems to use p-adic numbers to permit a RSA cryptosystem to send rational numbers or to add randomness to the RSA cryptosystem. An embodiment may convert at the source device a rational number to an integer as p-adic based Hensel code representation of the rational number at the source device and then recover the rational number at the destination device by reversing the Hensel code back to the original rational number. Another embodiment may use a g-adic inverse of a message value together with a random number to obtain a different rational number to encrypt for each different random number resulting in different ciphertexts representing the same message
(Continued)

value while still recovering the original message value despite having a different ciphertexts for the same message value. The various embodiments further retain the multiplicative homomorphism of the RSA cryptosystem since the p-adic Hensel codes are also multiplicative homomorphic.

8 Claims, 3 Drawing Sheets

Related U.S. Application Data

(60) Provisional application No. 63/079,676, filed on Sep. 17, 2020.

(51) Int. Cl.
  *H04L 9/32* (2006.01)
  *H04L 9/08* (2006.01)

(52) U.S. Cl.
  CPC .......... *H04L 9/3249* (2013.01); *H04L 9/0869* (2013.01); *H04L 9/3093* (2013.01)

(56) References Cited

U.S. PATENT DOCUMENTS

| | | | | |
|---|---|---|---|---|
| 2004/0208317 A1* | 10/2004 | Imai | ........................ | H04L 9/002 380/44 |
| 2005/0220299 A1* | 10/2005 | Lipson | .................... | H04L 9/302 380/30 |
| 2005/0220300 A1* | 10/2005 | Lipson | .................... | H04L 9/302 380/30 |
| 2006/0251248 A1* | 11/2006 | Lipson | .................... | H04L 9/302 380/44 |
| 2008/0019508 A1* | 1/2008 | Lipson | .................... | H04L 9/302 380/30 |
| 2013/0236012 A1* | 9/2013 | Lipson | .................... | H04L 9/302 380/255 |
| 2015/0222434 A1* | 8/2015 | Kim | ........................ | H04L 9/302 380/28 |
| 2017/0279600 A1* | 9/2017 | Georgieva | .............. | H04L 9/003 |
| 2019/0248221 A1* | 8/2019 | Serrano | ................ | B60K 5/1283 |

FOREIGN PATENT DOCUMENTS

| | | | | |
|---|---|---|---|---|
| JP | 2003318778 A | * | 11/2003 | |
| KR | 100330510 B1 | * | 4/2002 | |
| WO | WO-2005099150 A2 | * | 10/2005 | ............... H04L 9/28 |
| WO | WO-2010133186 A1 | * | 11/2010 | ........... G06F 1/3206 |

OTHER PUBLICATIONS

David William Honorio Araujo Da Silva; (A Mathematical Framework Towards Efficient Clifford-Based Homomorphic Cryptosystems Using p. Adic Numbers); pp. 24; Published in (Year: 2020).*

* cited by examiner

100 BLOCK DIAGRAM OF HARDWARE IMPLEMENTATION FOR A P-ADIC NUMBER ENHANCED RSA CRYPTOSYSTEM EMBODIMENT

202

SOURCE COMPUTING DEVICE

ENCODE RATIONAL NUMBER $a$ USING HENSEL ENCODING WITH A VALUE $v$ TO OBTAIN AN INTEGER HENSEL CODE $h$ OF THE RATIONAL NUMBER $a$
206

ENCRYPT THE INTEGER HENSEL CODE $h$ USING RSA ENCRYPTION PROCESSES TO OBTAIN CIPHERTEXT $c$
208

SEND CIPHERTEXT $c$ TO THE DESTINATION COMPUTING DEVICE
210

204

DESTINATION COMPUTING DEVICE

DECRYPT CIPHERTEXT $c$ USING RSA DECRYPTION PROCESSES TO OBTAIN THE INTEGER HENSEL CODE $h$
212

DECODE INTEGER HENSEL CODE $h$ USING EEA WITH A VALUE $v$ TO OBTAIN THE RATIONAL NUMBER $a$
214

200 FLOW CHART OF A P-ADIC NUMBER ENHANCED RSA CRYPTOSYSTEM EMBODIMENT FOR ENCRYPTING RATIONAL NUMBERS

FIG. 2

METHODS AND SYSTEMS FOR ENCRYPTING RATIONAL NUMBERS AND ADDING RANDOMNESS TO RSA CRYPTOSYSTEMS USING P-ADIC NUMBERS

CROSS REFERENCE TO RELATED APPLICATIONS

This application is a continuation of international application serial number PCT/U.S. Pat. No. 21,150,988, filed Sep. 17, 2021, which is based upon and claims the benefit of U.S. provisional application Ser. No. 63/079,676, filed Sep. 17, 2020, entitled "p-adic Numbers and Applications to Cryptography," the contents of which applications are specifically incorporated by reference herein for all that they disclose and teach.

BACKGROUND OF THE INVENTION

The advancement of science is possible when knowledge is shared and information is exchanged in a seamless manner. In a world where many businesses rely on information as their main assets, analysis over data is a crucial competitive advantage. Consequently, the amount of data processed and stored will continue to increase, creating a demand for virtualized services. To this end, some applications can be provided as cloud computing resources including Internet of Things (IoT), machine learning, virtual reality (VR) and blockchain. As a result, concerns about custody and privacy of data are on the rise.

Modern concealment/encryption employs mathematical techniques that manipulate positive integers or binary bits. Asymmetric concealment/encryption, such as RSA (Rivest-Shamir-Adleman), relies on number theoretic one-way functions that are predictably difficult to factor and can be made more difficult with an ever-increasing size of the encryption keys. Symmetric encryption, such as DES (Data Encryption Standard) and AES (Advanced Encryption Standard), uses bit manipulations within registers to shuffle the concealed text/cryptotext to increase "diffusion" as well as register-based operations with a shared key to increase "confusion." Diffusion and confusion are measures for the increase in statistical entropy on the data payload being transmitted. The concepts of diffusion and confusion in encryption are normally attributed as first being identified by Claude Shannon in the 1940s. Diffusion is generally thought of as complicating the mathematical process of generating unencrypted (plain text) data from the encrypted (cryptotext) data, thus, making it difficult to discover the encryption key of the concealment/encryption process by spreading the influence of each piece of the unencrypted (plain) data across several pieces of the concealed/encrypted (cryptotext) data. Consequently, an encryption system that has a high degree of diffusion will typically change several characters of the concealed/encrypted (cryptotext) data for the change of a single character in the unencrypted (plain) data making it difficult for an attacker to identify changes in the unencrypted (plain) data. Confusion is generally thought of as obscuring the relationship between the unencrypted (plain) data and the concealed/encrypted (cryptotext) data. Accordingly, a concealment/encryption system that has a high degree of confusion would entail a process that drastically changes the unencrypted (plain) data into the concealed/encrypted (cryptotext) data in a way that, even when an attacker knows the operation of the concealment/encryption method (such as the public standards of RSA, DES, and/or AES), it is still difficult to deduce the encryption key.

Homomorphic Encryption is a form of encryption that allows computations to be carried out on concealed cipher text as it is concealed/encrypted without decrypting the cipher text that generates a concealed/encrypted result which, when decrypted, matches the result of operations performed on the unencrypted plaintext.

The word homomorphism comes from the ancient Greek language: ὁμός (homos) meaning "same" and μορφή (morphe) meaning "form" or "shape." Homomorphism may have different definitions depending on the field of use. In mathematics, for example, homomorphism may be considered a transformation of a first set into a second set where the relationship between the elements of the first set are preserved in the relationship of the elements of the second set.

For instance, a map f between sets A and B is a homomorphism of A into B if $$f(a_1 \text{ op } a_2) = f(a_1) \text{ op } f(a_2) | a_1, a_2 \in A$$

where "op" is the respective group operation defining the relationship between A and B.

More specifically, for abstract algebra, the term homomorphism may be a structure-preserving map between two algebraic structures such as groups, rings, or vector spaces. Isomorphisms, automorphisms, and endomorphisins are typically considered special types of homomorphisms. Among other more specific definitions of homomorphism, algebra homomorphism may be considered a homomorphism that preserves the algebra structure between two sets.

SUMMARY OF THE INVENTION

An embodiment of the present invention may comprise a method for encrypting a rational number a with a RSA (Rivest-Shamir-Adleman) cryptosystem for communication between a source device and a destination device wherein the RSA cryptosystem has a public key e, two secret prime numbers p and q, a public key n such that n=pq, and the private keys $\phi(n)$ and d that are computed as $\phi(n)=(p-1)(g-1)$ and $d=e^{-1} \mod \phi(n)$, the method comprising: encoding by the source device the rational number a using p-adic based integer Hensel encoding as a function of a Hensel encoding value v and the rational number a to obtain integer Hensel code h, where the rational number a is comprised of a fraction a/b with numerator a and denominator b, where the numerator a, denominator h, and Hensel encoding value v are pairwise coprime, and where an absolute value of the numerator a and denominator b are less than the Hensel encoding value v; encrypting by the source device the integer Hensel code h using RSA cryptosystem encryption processes to obtain ciphertext c; sending by the source device the ciphertext c to the destination device; decrypting by the destination device the ciphertext c using RSA decryption processes to obtain the integer Hensel code h; and decoding by the destination device the integer Hensel code h using an Extended Euclidean Algorithm (EEA) as a function of the Hensel encoding value v and the Hensel code h to obtain the corresponding rational number α.

An embodiment of the present invention may further comprise a method for randomizing ciphertexts of a message value m for a RSA (Rivest-Shamir-Adleman) cryptosystem for communication between a source device and a destination device wherein the RSA cryptosystem has a public key e, two secret prime numbers p and q, a public key n such that n=pq, and the private keys $\phi(n)$ and d that are computed as $\phi(n)=(p-1)(g-1)$ and $d=e^{-1} \mod \phi(n)$, the method comprising: computing by the source device a g-adic number inverse $H_g^{-1}$ as a function of a first prime number x and a second prime number y acting as prime numbers for the g-adic number inverse $H_g^{-1}$, and the message value m and a random number s acting as Hensel codes for the g-adic number inverse $H_g^{-1}$ to obtain rational number α, where the random number s is changed for each subsequent encryption operation and the rational number a is comprised of a fraction a/b with numerator a and denominator b, and such that the rational number α is different for each different random numbers in the subsequent encryption operations for the message value in that does not change so as to randomize a ciphertext value c based on the rational number α that changes as the random number s is changed even when the message value m remains constant; encoding by the source device the rational number α using p-adic based integer Hensel encoding as a function of the public key n and the rational number α to obtain integer Hensel code h; encrypting by the source device the integer Hensel code h using RSA cryptosystem encryption processes to obtain ciphertext c; sending by the source device the ciphertext c to the destination device; decrypting by the destination device the ciphertext c using RSA decryption processes to obtain the integer Hensel code h; decoding by the destination device the integer Hensel code h using an Extended Euclidean Algorithm (EEA) as a function of the public key n and the Hensel code h to obtain the corresponding rational number α; and encoding by the destination device the rational number α using p-adic based integer Hensel encoding as a function of the first prime number x and the rational number α to obtain message value m that is a Hensel code of the rational number α.

An embodiment of the present invention may further comprise an RSA (Rivest-Shamir-Adleman) cryptosystem that encrypts a rational number α for communication between a source device and a destination device wherein the RSA cryptosystem has a public key e, two secret prime numbers p and q, a public key n such that pq, and the private keys ϕ(n) and d that are computed as ϕ(n)=(p−1)(q−1) and d=e$^{-1}$ mod ϕ(n), the RSA cryptosystem comprising: the source device, wherein the source device further comprises: a Hensel code encoding subsystem that encodes device the rational number α using p-adic based integer Hensel encoding as a function of a Hensel encoding value v and the rational number α to obtain integer Hensel code h, where the rational number α is comprised of a fraction a/b with numerator a and denominator b, where the numerator a, denominator b, and Hensel encoding value v are pairwise coprime, and where an absolute value of the numerator a and denominator b are less than the Hensel encoding value v; an encryption subsystem that encrypts the integer Hensel code h using RSA cryptosystem encryption processes to obtain ciphertext c; and a send subsystem that sends the ciphertext c to the destination device; and the destination device, wherein the destination device further comprises: a decryption subsystem that decrypts the ciphertext c using RSA decryption processes to obtain the integer Hensel code h; and a Hensel code decode subsystem that decodes the integer Hensel code h using an Extended Euclidean Algorithm (EEA) as a function of the Hensel encoding value v and the Hensel code h to obtain the corresponding rational number α.

An embodiment of the present invention may further comprise an RSA (Rivest-Shamir-Adleman) cryptosystem that for randomizes ciphertexts of a message value in for communication between a source device and a destination device wherein the RSA cryptosystem has a public key e, two secret prime numbers p and q, a public key n such that n=pq, and the private keys ϕ(n) and d that are computed as ϕ(n)=(p−1)(q−1) and d=e$^{-1}$ mod ϕ(n), the RSA cryptosystem comprising: the source device, wherein the source device further comprises: a g-adic number inverse subsystem that computes a g-adic number inverse $H_g^{-1}$ as a function of a first prime number x and a second prime number y acting as prime numbers for the g-adic number inverse $H_g^{-1}$, and the message value m and a random number s acting as Hensel codes for the g-adic number inverse $H_g^{-1}$ to obtain rational number α, where the random number s is changed for each subsequent encryption operation and the rational number α is comprised of a fraction a/b with numerator a and denominator b, and such that rational number α is different for each different random number s in the subsequent encryption operations for the message value m that does not change so as to randomize a ciphertext value c based on the rational number α that changes as the random number s is changed even when the message value in remains constant; a Hensel code encoding subsystem that encodes the rational number α using p-adic based integer Hensel encoding as a function of the public key n and the rational number α to obtain integer Hensel code h; an encryption subsystem that encrypts the integer Hensel code h using RSA cryptosystem encryption processes to obtain ciphertext c; and a send subsystem that sends the ciphertext c to the destination device; and the destination device, wherein the destination device further comprises: a decryption subsystem that decrypts the ciphertext c using RSA decryption processes to obtain the integer Hensel code h; a Hensel code decode subsystem that decodes the integer Hensel code h using an Extended Euclidean Algorithm (EEA) as a function of the public key n and the Hensel code h to obtain the corresponding rational number α; and a Hensel code message recovery subsystem that encodes the rational number α using p-adic based integer Hensel encoding as a function of the first prime number x and the rational number α to obtain message value in that is a Hensel code of the rational number α.

BRIEF DESCRIPTION OF THE DRAWINGS

In the drawings,

FIG. 2 is a flow chart of a p-adic number enhanced RSA cryptosystem embodiment for encrypting rational numbers.

DETAILED DESCRIPTION OF THE EMBODIMENTS

1. Introduction

Figure 1:
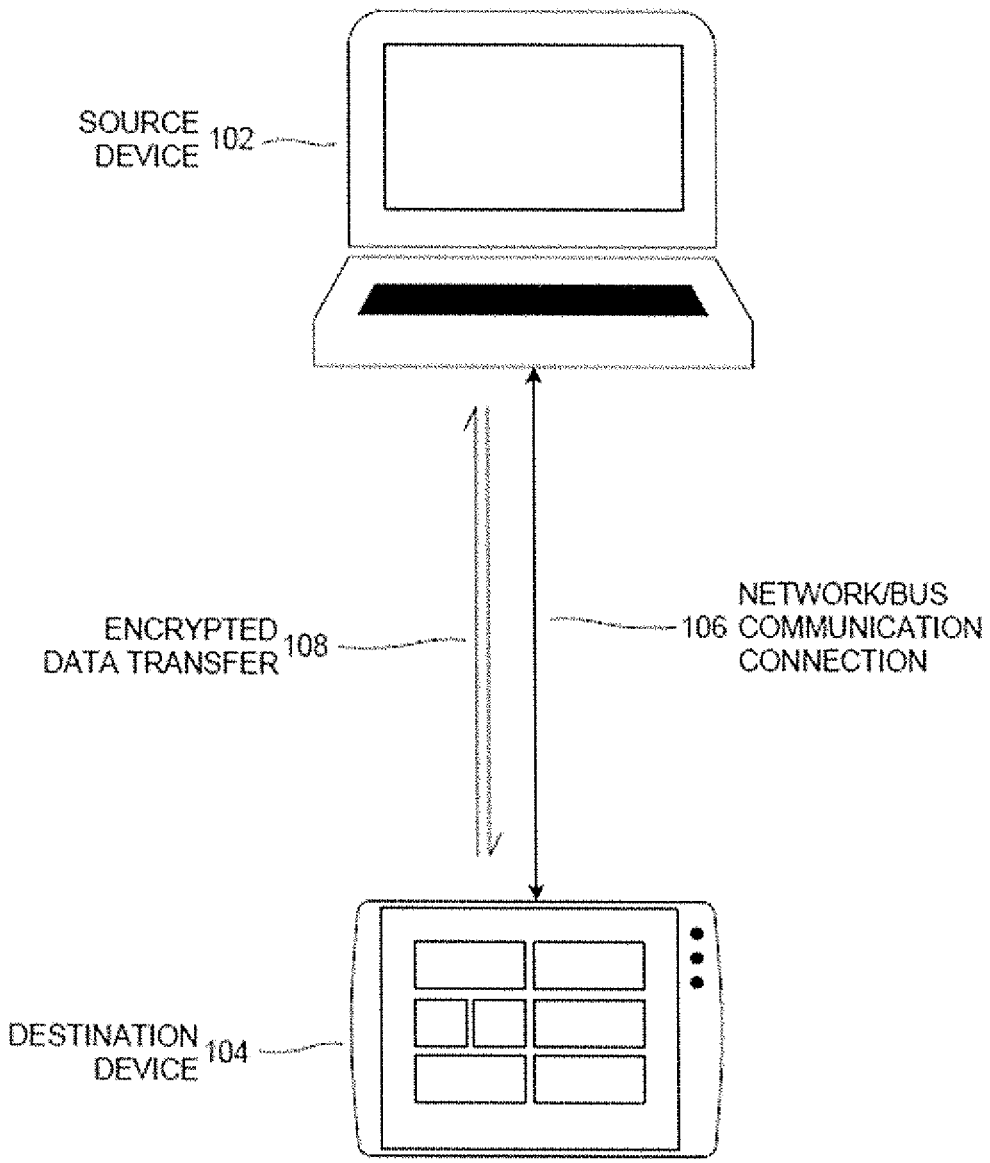
FIG. 1 is a block diagram of the hardware implementation for a p-adic number enhanced RSA cryptosystem embodiment.

The 1970s and 1980s were very important times for cryptography since it was during this particular period that most of the mathematical ideas for modern cryptography were established. In 1976, Diffie and Hellman proposed methods for key exchange and digital signatures in which the security is related to the discrete logarithm problem in finite fields. In 1978, Merkle introduced a method for secret key distribution based on randomized "puzzles.". Later in 1978 Rivest, Shamir and Adleman (RSA) introduced a method for obtaining digital signatures and public key cryptosystems, which was later referred to as the RSA cryptosystem, based on the factorization problem. Yet in 1978, McEliece proposed a public-key encryption scheme based on Goppa codes. As noted by Hellman, the aforementioned authors are considered the first publicly known proponents of public-key cryptosystems. Among these, the Diffie-Hellman key exchange and the RSA cryptosystem are of special relevance in the history of cryptography up to present time given they are not only two of the first public-key cryptosystems but also cryptosystems based on number theory. None of the aforementioned works proved secure. In fact, at that point in time, formal definitions of security were not yet in place and some of the schemes proposed (e.g., RSA) were actually demonstrably insecure. However, they are all relevant from a historical standpoint.

In 1985 Miller and in 1978 Koblitz, independently, proposed the use of elliptic curves in cryptography in which it is possible to construct cryptographic protocols based on the elliptic curve discrete logarithm problem. For this reason, it is possible to implement the ideas of Diffie and Hellman with elliptic curves, which is known as elliptic curve Diffie-Hellman, as well as providing a signature scheme with the elliptic curve digital signature algorithm. Many other protocols based on the discrete logarithm problem have been implemented with elliptic curves where all the solutions to cryptography that are based on elliptic curves are identified as elliptic curve cryptography (ECC).

In 1996, Ajtai introduced a class of random problems in lattice theory which are demonstrated to be difficult to solve based on the shortest vector problem, and in 1997 Ajtai and Dwork introduced a public-key cryptosystem based on lattices while showing that the average case of the problems showcased by Ajtai were as hard as the worst-case ones. In 1998 Hoffstein, Pipher and Silverman proposed lattice-ring-based public-key cryptosystem and in 2005 Regev introduced another public-key cryptosystem based on the problem of learning with errors, which can be related to lattice problems. Many authors found lattices a promising mathematical resource for constructing cryptographic solutions and soon enough the term lattice-based cryptography was adopted to identify the set of cryptographic solutions supported by lattice theory. In 2009 Gentry introduced the first fully homomorphic encryption scheme which was based on ideal lattices followed by several other lattice-based variants. As it happened with ECC, lattice-based cryptography is an active field of research.

As can be seen, elliptic curves and lattices are two examples of mathematical resources in which researchers encounter a vastness of opportunities for constructing cryptographic solutions to the extent of creating their own branch of research within cryptography. The various embodiments take advantage of another mathematical resource that is similarly rich, versatile, intuitive and powerful, namely, the p-adic number theory. Although p-adic numbers are somehow present in some cryptographic contexts, it has today a minor role when compared with p-adic number theory's potential of being a major field of research in cryptography. When proposing the use of elliptic curves in cryptography, Miller remarked that his intent was to "show that elliptic curves have a rich enough arithmetic structure so that they will provide a fertile ground for planting the seeds of cryptography." Analogously, the disclosure of the various embodiments is expected to show that p-adic numbers have a rich arithmetic structure to arouse a growing research interest on p-adic number theory's properties aimed at cryptographic constructions.

1.1 Our Contribution

We propose a modern, self-contained and minimum required elementary introduction to the p-adic number theory with emphasis in a distinct subset of properties and functions that we identify as valuable to cryptography. We provide efficient algorithms for the main mappings within the p-adic arithmetic alongside insights and practical examples of how to use them in the context of cryptography. We propose methods for allowing crypto algorithms over the integers to accept rational numbers. As we approach security concerns in cryptography via p-adic numbers, we introduce methods for adding randomness to deterministic crypto algorithms that can be easily extended to be able to randomize just about any deterministic algorithm. We propose a protocol for distributed computation where any input can be transformed into an arbitrary number of p-adic digits where number k of parties perform a joint computation, each one on their individual digit without having any knowledge of what that digit represents and what the other digits are. In a similar approach we propose methods for aiding parallel computation and we demonstrate how to parallelize a given function in terms of p-adic digits. By combining properties of our discussed constructions, we introduce a fully homomorphic encryption (FHE) scheme and we show its connection with the prime factorization and the discrete logarithm problem from a Hensel's lemma perspective.

1.2 Related Work

In 1817, Kurt Hensel introduced the p-adic number theory and since then it has been studied as part of Number Theory, however, it was only in the 1970s and 1980s that this branch of mathematics had any traction due to the work of Krishnamurthy, Rao, and Subramanian, and Alparslan when they found that the finite segment of the p-adic arithmetic was an efficient solution for error-free computation. During this period, other researchers became interested in error-free computation via p-adic numbers and helped to consolidate the finite segment p-adic number theory for practical applications in several areas of physics, engineering and computer science. The subject rapidly advanced with the contributions of Gregory, Beiser, Farinmade, Hehner and Horspool, and Lewis, among others. The practical implications of working with the finite p-adic arithmetic for error-free computation were so vast that Rao remarked that would not need to have a complete understanding of the theoretical aspects of p-adic numbers in order to work with its finite segment, since the theory of the finite segment p-adic had become a well-organized and a nearly self-sufficient subset of the theory of p-adic numbers. Krishnamurthy, Rao, and Subramanian named the finite-segment p-adic numbers as Hensel codes. Along-side with error-free computation, p-adic numbers have been successfully applied to parallel computation. The theory of p-adic numbers is currently present in many other theories, including the theory of dynamical systems, theoretical physics, number theory, algebraic geometry, non-Archemdian analysis, differential calculus, topology, and analytic functions.

2. p-adic Numbers

Let p be prime. Any positive integer x can be represented uniquely as an expansion of the form $x=a_0+a_1p+a_2p^2+\ldots+a_np^n$ for some n, where $a_1$ is an integer with $0 \le a_i \le p$. That is, $a_0+a_1p+a_2p^2+a_np^n$ is the base-p representation of x. One of Hensel's main motivations was to relate the integers $\mathbb{Z}$ to the field of rationals $\mathbb{Q}$, which gives rise to the p-adic number system. In the p-adic number system, all rational numbers in the field of rational numbers $\mathbb{Q}$ are represented as unique infinite expansions $\alpha=\Sigma a_i p^i$, where i is an integer and the value for any given $a_i$ is in the range $[0, p-1]$. In this work we focus our attention on the finite-segment p-adic number theory and from now on we discuss its foundation, main properties and opportunities for possible practical applications.

2.1 Hensel Codes

Gregory and Krishnamurthy remarked that there are a large number of ill-conditioned problems as well as numerically unstable algorithms in which cases rounding errors cannot be tolerated during computation. As one approach to solve this problem one might apply finite number systems (also known as residue number systems or RNS) in which one is able to perform computations free of rounding errors. The most common RNS number systems are probably the single-modulus and multiple-modulus. In this section we discuss another method to achieve error-free computation with truncated infinite p-adic expansions known as Hensel Codes (see Definition 3 below). Hensel's Lemma showed that increasing the number of terms in a p-adic expansion is equivalent to finding a unique integer root for a larger power of p. In the finite-segment p-adic number system, each rational number in a given finite set of $\mathbb{Q}$ is mapped to a unique integer root that will be referred to as an integer Hensel code. Computations performed over Hensel codes are mathematically equivalent to computations performed over their corresponding rational numbers, which was shown with infinite p-adic expansions; however, there are some special considerations to preserve uniqueness and correctness when working with the truncated expansions. The finite-segment p-adic arithmetic, as a type of RNS, is free of rounding errors.

Definition 1. A residue number system (RNS) is a numerical system in which an integer $x \in \{0, \ldots, M-1\}$, where $M = \Pi_{i=1}^{k} m_i$, is uniquely represented in terms of its congruences with a set of k distinct and pairwise coprime moduli $\{m_1, \ldots, m_k\}$, which generate a set of k remainders $\{x_1, \ldots, x_k\}$ such that $x_i = x \bmod m_i$ and $0 \leq x_i \leq m_i$, for $i = 1 \ldots k$, such that there is a ring isomorphism guaranteed by the Chinese Remainder Theorem (CRT).

A p-adic expansion is a summation of the form $\Sigma_{i=k}^{\infty} a_i p^i$, with $a_i \in (0, \ldots, p-1)$. Any p-adic expansion naturally gives rise to the sequence of partial sums $(\alpha_n)$ where $\alpha_n = \Sigma_{i=k}^{n} m_i$. Note that this is always a Cauchy sequence with respect to the p-adic absolute value, and so every p-adic expansion can be said to converge to an element of p. A p-adic expansion is finite if it contains only a finite number of non-zero p-adic digits. Given a prime p, let an element h in $\mathbb{Z}_p$ that represents a rational $\alpha$ be a p-adic digit. In integer representation, if multiple primes are used to encode $\alpha$, say $(p_1, \ldots, p_k)$, then a is represented by multiple p-adic digits $(h_1, \ldots, h_k)$ where $h_i \in \mathbb{Z}_p$, $i = 1 \ldots k$.

Definition 2. For any prime p, the finite-segment p-adic number system is the replacement of the arithmetic over the rational numbers by the arithmetic over the integers modulo p.

Theorem 1. The finite-segment p-adic number system is a RNS (residue number system).

Proof. It is easier to prove the finite p-adic number system as a RNS for k p-adic digits where k>1. However, we generalize it as follows: consider a k-digit Hensel code, for $k \geq 1$, and $g = \Pi_{i=1}^{k} p_i$. The Hensel code of $\alpha = a/h$ encoded with g is an integer $x$ $ab^{-1} \bmod g$, for $x \in \{0, \ldots, g-1\}$, such that each individual Hensel digit corresponding to each $p_i$ in g is computed as:

$$(h_1, \ldots, h_k) = (x \bmod p_1, \ldots, x \bmod p_k) \qquad \text{Eq. 1}$$

For the particular case where k=1, it is obvious that h=x mod p.

Remark 1. Arithmetic in the finite-segment p-adic number system is equivalent to the single-modulus RNS if the single modulus is an integer of the form $m = p^r$ where p is a prime number and r is an arbitrary positive integer.

Definition 3. The r-order Hensel code of a rational number $\alpha$ is the truncation of the p-adic expansion of a to r digits. We write this as H (p, r, $\alpha$).

Theorem 2 shows one approach for mapping to Hensel codes. The method finds the partial sum of an infinite p-adic expansion, converts it to radix-p form, and reverses the order of the digits.

Theorem 2. For all $\alpha = a/b$ in $\mathbb{Q}$ there is a $n \in \mathbb{Z}$ such that we can rewrite a/b as:

$$\frac{a}{b} = \frac{c}{d} p^n \qquad \text{Eq. 2}$$

where gcd (c, d) = gcd (c, p) = gcd (d, p) = 1. (gcd—greatest common denominator) We can then write the Hensel code for c/d as:

$$H(p,r,c/d) = a_0 a_1 a_{r-1}, \qquad \text{Eq. 3}$$

where $a_{r-1} \ldots a_0 a_1$ is the base p representation for the integer $cd^{-1} \bmod p^r$. In other words, $$cd^{-1} \bmod p^r = a_0 + a_1 p + a_2 p^2 + a_{r-1} p^{r-1}. \qquad \text{Eq. 4}$$

Proof Let c/d be computed by the following p-adic expansion:

$$\frac{c}{d} = \sum_{j=0}^{\infty} a_j p^j = \left(a_0 + a_1 p + \ldots + a_{r-1} p^{r-1}\right) + p^r R_r. \qquad \text{Eq. 5}$$

Then we write $c = d(a_0 + a_1 p + a_{r-1} p^{r-1}) + p_r(dR_r)$. Then, $$c \bmod p^r = d(a_0 + a_1 p + a_{r-1} p^{r-1}) \bmod p^r, \qquad \text{Eq. 6}$$

which implies:

$$cd^{-1} \bmod p^r = a_0 + a_1 p + \ldots + a_{r-1} p^{r-1}, \qquad \text{Eq. 7}$$

Example 1. Consider $\alpha = 8/3 \in \mathbb{Q}$, r=4, and p=5. Find the partial sum corresponding infinite p-adic expansion.

$$cd^{-1} \bmod p^r = 8 \cdot 3^{-1} \bmod 625 = 8 \cdot 417 \bmod 625. = 3336 \bmod 625. = 211 \qquad \text{Eq. 8}$$

The sum of the truncated expansion is 211 in base 10, which is 1321 in base 5. Reversing the order of the digits and placing a p-adic point gives a=0.1231.

Example 2. Consider the two rational numbers $\alpha = 3/4$ and $\beta = 381/76$ mapped to $\mathbb{Q}_3$. The Hensel codes with r=4 are given below.

$$H(p=3, r=4, \alpha=3^1(1/4)) = 3^1[(1 \cdot 61) \bmod 81] = 16 \qquad \text{Eq. 9}$$

$$H(p=3, r=4, \beta=3^1(127/76)) = 3^1[(127 \cdot 16) \bmod 81] = 16 \qquad \text{Eq. 10}$$

Verify, $$ad = cb \bmod p^r \; 228 = 1524 \bmod 81 = 66 \qquad \text{Eq. 11}$$

The resulting Hensel codes are identical, which illustrates that uniqueness is no longer valid for every $\alpha \in \mathbb{Q}_p$ in the finite-segment number system. As a result, a finite set of $\mathbb{Q}_p$ is defined to ensure uniqueness and correctness for Hensel codes, and arithmetic on Hensel codes. The set of order-N Farey fractions, originally denoted by $\mathbb{F}_N$, is classically defined in various texts. However, we propose new notation and a new definition for the order-N Farey fractions with respect to a prime p which is consistent with the applications of p-adic numbers throughout this work. But before introducing the new notation and new definitions we will discuss the basics of the mapping between order-N Farey fractions and Hensel codes over the integers.

2.2 Hensel Code Mappings Over the Integers

Section 2.1 showed two different methods for obtaining a Hensel code. In this section, we introduce the integer Hensel code, which is simply the partial sum of the truncated p-adic expansion. All previous examples with infinite p-adic expansions showed that given enough terms, the convergence for an expansion is found by arranging the terms as a geometric series. However, if enough terms are not given, a truncated p-adic expansion cannot be represented as a geometric series, which calls for an alternative method to solve for convergence of an integer Hensel code to the corresponding rational number in $\mathbb{Q}$. The Extended Euclidean Algorithm (EEA) is one method to obtain the corresponding rational number.

From this point on, we will consider an isomorphic mapping between the order-N Farey fractions and a corresponding set of Hensel codes with respect to $p^r$ for $r=1$. Thus, we will suppress r in the notation for clarity. The reason for this decision will be discussed next.

Theorem 3. Given $\alpha=a/b$ and p such that a, b, and p are pairwise coprime, and $|a|, |b| < p$ there is a unique value of $h=H(p, a)$, $h<p$ which is computed as follows:

$$h = H(p, \alpha) = ab^{-1} \bmod p, \qquad \text{Eq. 12}$$

where V is the modular multiplicative inverse of b with respect to p.

Proof. The computation of h as in Eq. 12 is fairly intuitive. Recall that any rational number $\alpha/b$ can be rewritten as $a \cdot b^{-1} = a \cdot 1/b$. However, while working with arithmetic mod p, we compute $a \cdot b^{-1} \bmod p$ such that $h^{-1}$ is the only integer that satisfies $b \cdot b^{-1} \bmod p = 1$. The value of a can be obtained from h by solving $a = bh + kp$, where $k=(a-bh)/p$. This is a Diophantine equation which can be solved by the EEA. We thus have $a = bh + kp$ and $b = (a-kp)/h$ and therefore h can be alternatively computed as $h = (a-kp)/b$.

Definition 4. A convergent is a rational number obtained via a limited number of terms in a continued fraction and it is typically denoted by $p_n/q_n$ for n convergents of a rational number x where $p_n/q_n$ is the n-th convergent of x.

Kraeft remarked that every irreducible rational number $\alpha/h$ which satisfies the inequality:

$$\left|\frac{c}{d} - \frac{a}{b}\right| < \frac{1}{2b^2} \qquad \text{Eq. 13}$$

is convergent of c/d.

Lemma 1. For all p/q, $x \in \mathbb{Q}$, if $$\left|x - \frac{p_n}{q_n}\right| \leq \frac{1}{q_n q_{n+1}} < \frac{1}{q_n^2}, \qquad \text{Eq. 14}$$

then p/q is a convergent of x.

Proof. In order to find the distance between a convergent $$\frac{p_n}{q_n}$$

of a continued fraction and the fraction itself x, we begin by establishing, $$[a_0, a_1, \ldots, a_n] = a_0 + \cfrac{1}{a_1 + \cfrac{1}{a_2 + \cdots \cfrac{1}{a_n}}} \qquad \text{Eq. 15}$$

and $$\begin{array}{llll} p_0 = a_0, & q_0 = 1, & p_n = a_n p_{n-1} + p_{n-2} \\ p_1 = a_1 a_0 + 1, & q_1 = a_1 & q_n = a_n q_{n-1} + q_{n-2} \end{array}. \qquad \text{Eq. 16}$$

Thus, $$a_n = \frac{p_n}{q_n} = \begin{cases} a_0, & n = 0 \\ a_0 + \dfrac{1}{a_1}, & n = 1 \\ \dfrac{a_n p_{n-1} + p_{n-2}}{a_n q_{n-1} + q_{n-2}}, & n \geq 2 \end{cases} \qquad \text{Eq. 17}$$

Every $a_n$ is a partial quotient of the continued fraction, which has a corresponding complete quotient $a_n' = a_n + \xi_n$ with $0 \leq \xi_n < 1$. As a result, x can be represented as $$x = \frac{a_{n+1}' p_n + p_{n-1}}{a_{n+1}' q_n + q_{n-1}}.$$

Therefore, $$x - \frac{p_n}{q_n} \text{ is:}$$

$$\begin{aligned} x - \frac{p_n}{q_n} &= \frac{a_{n+1}' p_n + p_{n-1}}{a_{n+1}' q_n + q_{n-1}} - \frac{p_n}{q_n} \qquad \text{Eq. 18} \\ &= \frac{a_{n+1}' p_n q_n + p_{n-1} q_n}{q_n(a_{n+1}' q_n + q_{n-1})} - \frac{a_{n+1}' p_n q_n + p_{n-1} q_{n-1}}{q_n(a_{n+1}' q_n + q_{n-1})} \\ &= \frac{p_{n-1} q_n - p_n q_{n-1}}{q_n(a_{n+1}' q_n + q_{n-1})} \end{aligned}$$

Observe that $p_{n-1}q_n - p_n q_{n-1} (-1)^n$, which can be verified with $n=2$. Therefore, $$x - \frac{p_n}{q_n} = \frac{p_{n-1}q_n - p_n q_{n-1}}{q_n(a_{n+1}' q_n + q_{n-1})} = \frac{(-1)^n}{q_n(a_{n+1}' q_n + q_{n-1})} \qquad \text{Eq. 19}$$

Let $q_1' = a_n'$ and $q_n = a_n' q_{n-1} + q_{n-2}$. Then, $$x - \frac{p_n}{q_n} = \frac{(-1)^n}{q_n(a_{n+1}' q_n + q_{n-1})} = \frac{(-1)^n}{q_n q_{n+1}'} \qquad \text{Eq. 20}$$

Notice that q increases steadily as n increases, so $q_n > q_{n-1}$. Similarly, $q_{n+1}' + q_{n+1}$ because $q_n' = a_n' q_{n-1} + q_{n-2}$, and $q_n = a_n q_{n-1} + q_{n-2}$, where the complete quotient $a_n$ is always greater than the partial quotient $a_n$. Then, the following inequalities can be defined.

$$q_{n+1}' \geq q_{n+1} > q_n \text{ and } \frac{1}{q_{n+1}'} \leq \frac{1}{q_{n+1}} < \frac{1}{q_n}. \quad \text{Eq. 21}$$

Finally, $$\left| x - \frac{p_n}{q_n} \right| = \frac{(-1)^n}{q_n q_{n+1}'} \leq \frac{1}{q_n q_{n+1}} < \frac{1}{q_n^2}. \quad \text{Eq. 22}$$

Example 3. Let $a_N = [1, 2, 3, 1]$, which gives the following values for $p_n$ and $q_n$.

$$\begin{aligned}
p_0 &= a_0 = 1 & q_0 &= 1 \\
p_1 &= a_1 a_0 + 1 = 3 & q_1 &= a_1 = 2 \\
p_2 &= a_2 p_1 + p_0 = 10 & q_2 &= a_2 q_1 + q_0 = 7 \\
p_3 &= a_3 p_2 + p_1 = 13 & q_3 &= a_3 q_2 + q_1 = 9
\end{aligned} \quad \text{Eq. 23}$$

and $$[1,2,3,1] = 1 + \cfrac{1}{2 + \cfrac{1}{3 + \cfrac{1}{1}}} \quad \text{Eq. 24}$$

which gives, $$\begin{aligned}
a_0' &= 1 + \frac{1}{2}, \\
a_1' &= 2 + \frac{1}{3}, & \xi_0 &= \frac{1}{2} \\
a_2' &= 3 + \frac{1}{1}, & \xi_1 &= \frac{1}{3} \\
a_3' &= \frac{1}{\xi_2} = 1, & \xi_2 &= \frac{1}{1}
\end{aligned} \quad \text{Eq. 25}$$

The distance between x and $$\frac{p_2}{q_2}$$

is:

$$\begin{aligned}
\left| x - \frac{p_2}{q_2} \right| &= \left| \frac{a_3' p_2 + p_1}{a_3' q_2 + q_1} - \frac{p_2}{q_2} \right| \\
&= \left| \frac{13}{9} - \frac{10}{7} \right| \\
&= \frac{1}{63}
\end{aligned} \quad \text{Eq. 26}$$

The inequality in Lemma 1 can be verified, where $$\frac{1}{q_2 q_3} = \frac{1}{63} \text{ and } \frac{1}{q_2^2} = \frac{1}{49}.$$

$$\left| x - \frac{p_2}{q_2} \right| = \frac{1}{63} \leq \frac{1}{q_2 q_3} < \frac{1}{q_2^2} \quad \text{Eq. 27}$$

Theorem 4. If given $\alpha = a/b$, we compute $h = ab^{-1} \mod p$, where $0 \leq |a| \leq N$, $0 < |b| \leq p/(N+1)$ for $N = \lfloor \sqrt{p/2} \rfloor$, then, since the EEA applied to p and h computes all the convergents of h/p, a is set to be the i-th convergent $a_i/y_i$ of h/p. We write this as $a = H^{-1}(p, h)$.

Proof We can rearrange $h = ab^{-1} \mod p$ as a modular equation:

$$hb - a \equiv 0 \mod p \quad \text{Eq. 28}$$

The aim is to show that $-k/b$ is a convergent of h/p by rearranging $$\left| h - \frac{a}{b} \right| \text{ as } \frac{a}{bp} = \frac{h}{p} - \frac{k}{b} \cdot hb - a$$

is congruent to 0 and therefore a multiple k of p. Thus, $$hb - a = kp \text{ and } a = hb - kp \quad \text{Eq. 29}$$

Then, dividing both sides by bp gives:

$$\frac{a}{bp} = \frac{h}{p} - \frac{k}{b} \quad \text{Eq. 30}$$

By applying Lemma 1 we can prove that $-k/b$ is a convergent of h/p by satisfying $$\left| \frac{h}{p^r} - \frac{k}{b} \right| < \frac{1}{b^2} \quad \text{Eq. 31}$$

and it can be computed by the algorithm that computes all the convergents, the EEA. Then the value a/b can be obtained by EEA as $a_i/y_i$ for the i such that $|y_i| \leq N$.

Definition 5. Let $\mathbb{C}_{h/p}$ denote the set of all convergents of h/p such that:

$$\mathbb{C}_{h/p} = \left\{ a/b \left| \left| \frac{h}{p} - \frac{k}{b} \right| < \frac{1}{b^2}, k = (bh - a)/p \right. \right\} \quad \text{Eq. 32}$$

Lemma 2. If r=1, given $\alpha = a/b$ and a prime number p, where a, b, p are pairwise coprime, the Hensel code h of $\alpha$ computed as $h = ab^{-1} \mod p$, then h is the zeroth term of the finite expansion that computes $\alpha$.

Proof. Given $\alpha = a/b$, we have $ba_0 \equiv a \mod p$, thus, the solution for $a_0 = ab^{-1} \mod p = h$.

We compute Theorem 4 via a modified version of the BEA (MEEA), which is given in Algorithm 1.

---

Algorithm 1: (MEEA) $a = H^{-1}(p, h)$
Input: p, h;
Output: a such that $h = H(p, a)$
$a_0 = p$, $a_1 = h$; $y_0 = 0$, $y_1 = 1$; $i = 1$; $N = \lfloor \sqrt{p/2} \rfloor$
while $a_i > N$ do
$\quad q = \lfloor a_{i-1}/a_i \rfloor$;
$\quad a_{i+1} = a_{i-1} - q \cdot a_i$;
$\quad y_{i+1} = y_{i-1} + q \cdot y_i$;
$\quad i = i + 1$;
end $$\alpha = ((-1)^{i+1} \cdot a_i)/y_i;$$
Result: a Example 4. Let h=97, p=241. We calculate a=$H^{-1}$ (p, h) as follows:

$$a_0p=241, a_1=h=97, y_0=0, y_1=1, i=1. \qquad \text{Eq. 33}$$

In the second iteration, we have:

$$q=\lfloor a_0/a_1 \rfloor=2, a_2=a_1-q\cdot a_0=47, y_2=y_1-q\cdot y_0=2, i=2, \qquad \text{Eq. 34}$$

and therefore:

$$q=\lfloor a_1/a_2 \rfloor=2, a_3=a_2-q\cdot a_1=3, y_3=y_2-q\cdot y_1=5, i=3, \qquad \text{Eq. 35}$$

and therefore:

$$c=(-1)^{i+1}\cdot a_i, d=y_i. \qquad \text{Eq. 36}$$

The result is then given by a=c/d=3/5

Remark 2. Algorithm 1 computes all the convergents $a_i/y_i$ of h/p until finding the first convergent that satisfies $$|a_i| \le N, |y_i| \le \left\lfloor \frac{p}{N+1} \right\rfloor, N = \lfloor \sqrt{p/2} \rfloor.$$

Theorem 5. Algorithm 1 runs in O (log N).

Proof Algorithm 1 is a modified EEA and this modification is solely on the setup of the inputs and the presentation of the results. Its complexity its truly defined by the while loop that computes all the convergents of h/p which is bounded by N and the complexity of the bounded computation of all convergents by the EEA is 0 (log N).

2.3 Order-N Farey Fractions

There are some additional properties of the set of order-N Farey fractions that are worth discussing. In this section we provide some insights on the mapping between those fractions and their corresponding Hensel codes which will be relevant in understanding why this relationship can be useful for cryptography.

Recall that a prime number p encodes p order-N Farey fractions, each one with their unique corresponding integer from the set $\mathbb{Z}_p=\{0, \ldots, p-1\}$. But what does N represent in terms of the mapping between order-N Farey fractions and their Hensel codes? We present some observations that we consider important in understanding this connection. We introduce Example 5 to illustrate that the order-N Farey fractions have 2N+1 integers and p−(2N+1) non-integer fractions. This metric is used in Theorem 8. Example 5 aims to assist the understanding that N determines the number of non-zero integer fractions allowed in the set, and by allowing zero, positive and negative integers, we have 2N+1.

Example 5. If $p_1$=17, then N=$\lfloor\sqrt{17/2}\rfloor$=2, and $p_1$ encodes 17 order-N fractions with 17 integer Hensel codes, as we can see below:

$$0/1 \to 0, 1/1 \to 1, 2/1 \to 2, -2/5 \to 3, -1/4 \to 4, -2/3 \to 5,$$
$$1/3 \to 6, 1/5 \to 7, -1/2 \to 8, 1/2 \to 9, -1/5 \to 10,$$
$$-1/3 \to 11, 2/3 \to 12, 1/4 \to 13, 2/5 \to 14,$$
$$-2/1 \to 15, -1/1 \to 16. \qquad \text{Eq. 37}$$

We observe that in the set of order-N Farey fractions in (37), there are 2N+1=5 integers and $p_1$−(2N+1)=17−5=12 non-integer fractions. If $p_2$=13, then N=$\lfloor\sqrt{13/2}\rfloor$=2, and $p_2$ encodes 13 order-N fractions with 13 integers, as we can see below:

$$0/1 \to 0, 1/1 \to 1, 2/1 \to 2, -1/4 \to 3, -1/3 \to 4, 2/3 \to 5,$$
$$-1/2 \to 6, 1/2 \to 7, -2/3 \to 8, 1/3 \to 9, 1/4 \to 10,$$
$$-2/1 \to 11, -1/1 \to 12. \qquad \text{Eq. 38}$$

Similarly, we observe that in the set of order-N Farey fractions in (38), there are 2N+1=5 integers and $p_2$−(2N+1) non-integer fractions.

Notice in Example 5 that $p_1$ and $p_2$ share the same N, which indicates that their corresponding set of order-N Farey fractions have the same number of integers, with, however, different number of non-integer Farey fractions. Notice also that in Algorithm 1, we only compute the convergents while the numerator is greater than N for a given prime p and Hensel code h.

Lemma 3. Given an odd prime p, N=$\lfloor\sqrt{p/2}\rfloor$, and the Hensel codes $h_\alpha, h_\beta \in \mathbb{Z}_p$ where $h_\alpha$=H(p, α), $h_\beta$=H(p, β) and α and β are integers, for all $h_\alpha \le$N, it holds that $H^{-1}$(p, $h_\alpha$)=α=$h_\alpha$ and for all $h_\beta$>N it holds that $H^{-1}$(p, $h_\beta$)=β≠$h_\beta$.

Proof. The modified EEA in Algorithm 1 is committed to compute all the convergents of a Hensel code h with respect to a prime p while $a_i$>N for N=$\lfloor\sqrt{p/2}\rfloor$. Any Hensel code less than or equal to N will decode to a rational a=h since the setup of the algorithm defines $a_0$=p and $a_1$=h. Thus, it is clear that if h is not greater than N, then the iterations that computes the convergents are never calculated and the result is guaranteed to be an integer since we defined $y_1$=1. With i=1, then it is guaranteed that $$\frac{(-1)^{1+1}\cdot a_1}{y_1} = h.$$

Conversely, if $a_i$ is indeed greater than N, this means that a convergent will be computed and a non-integer fraction will be output by the algorithm. Since Lemma 3 specifies that input order-N Farey fractions are integers, it is clear that whenever $a_i$>N, the resulting fraction α is not equal to its corresponding Hensel code h.

Corollary 1. In all sets of order-N Farcy fractions, there are N+1 non-negative integers which the corresponding Hensel codes are equal to the original fractions.

Corollary 2. A Hensel code h decoded with two distinct primes $p_1$ and $p_2$ will only result in the same order-N Farey fraction α if α∈$\mathbb{Z}$, α≤N and N=$\lfloor\sqrt{p_1/2}\rfloor$=$\lfloor\sqrt{p_2/2}\rfloor$.

Theorem 6. For all Hensel code h such that p−N≤h<p where N=$\lfloor\sqrt{p/2}\rfloor$ it holds that the order-N Farey fraction α associated with h is a negative integer in {−N, . . . , −1}. We write $H^{-1}$(p, h)=−x, x∈{1, . . . , N}.

Proof. The modified EEA in Algorithm 1 defines $a_0$=p and $a_1$=h. If N≤h≤p−N, then $a_1$>N. In the first iteration, q is defined as q=$\lfloor a_0/a_1 \rfloor$, with for h≥p−N<p will be always equal to 1. Then, we compute $a_2$ as $a_2$=$a_0$−$q_{a1}$, which for h≥p−N<p it holds that $a_2$≤N. Thus, there are no more iterations. Since q=1, $y_2$ is computed as $y_2$=$y_0$+q·$y_1$. Recall that in Algorithm 1, we start by defining $y_0$=0 and $y_1$=1. Thus, it holds that $y_2$=1. Since by the end of the first iteration i=2, then $((-1)^{2+1}\cdot a_2)/y_2$=−x, x∈{1, . . . , N}.

Theorem 7. For all prime p, there are p Hensel codes to encode p order-N (irreducible) Farey fractions where N=$\lfloor\sqrt{p/2}\rfloor$, which is composed by 2N+1 integers (fractions with one as the denominator) and p−(2N+1) non-integer fractions.

Proof. For all prime p and N=$\lfloor\sqrt{p/2}\rfloor$, Corollary 1 states that there are N+1 positive integer order-N Farey fractions in $\mathbb{C}_N$ and Theorem 6 states that there are N negative integer Farey fractions in $\mathbb{C}_N$, which gives a total of 2N+1 integers order-N Farey fractions in $\mathbb{C}_N$. The non-integer Farey fractions are then given by p−(2N+1).

We are now ready to formally state a new definition and notation for the set of order-N Farey fractions with respect to a prime p.

Theorem 8. For all prime p and $a/b \in \mathbb{Q}_p$, the set of order-N Farey fractions $\mathbb{C}_p$, where N is given by $N=\lfloor\sqrt{p/2}\rfloor$.

$$\mathbb{F}_p = \begin{cases} gcd(a, b) = gcd(a, p) = gcd(b, p) = 1 \\ \text{and } \frac{a}{b} \text{ is the first convergent in } \mathbb{C}_{h/p} \text{ such that} \\ 0 \le |a| \le N, 0 < |b| \le \lfloor p/(N+1) \rfloor \end{cases} \quad \text{Eq. 39}$$

Proof Lemma 3 states that all Hensel codes h≤N will decode to an order-N Farey fraction a=h and Theorem 6 states that all Hensel codes N≤h≥p−N<p will decode to an order-N Farey fraction α that is a negative integer in the set {−N, . . . , −1}. Thus, the first N+1 elements of $\mathbb{C}_p$ are non-negative integers and the last N elements of $\mathbb{C}_p$ are negative integers. Thus, it is clear that the last non-integer element of $\mathbb{C}_p$ is the one which the corresponding Hensel code is h=p−(N+1). Given this Hensel code h, the setup of Algorithm 1 sets as initial values $a_0=p$, $a_1=p-(N+1)$ and $y_0=0$, $y_1=1$. Then, in the first iteration, for all prime p that generates sets $\mathbb{C}_p$ with at least one non-integer fraction (e.g., p≥5), the result of $q=a_0/a_1=\lfloor p/p-(N+1)\rfloor$ will always be 1. Then, $a_2=p-(p-(N+1))=N+1$ $y_2=0+1\cdot1=1$ \quad Eq. 40

In the next iteration, we compute q, $a_3$ and $y_3$ as:

$q=\lfloor a_1/a_2 \rfloor = \lfloor (p-(N+1))/(N+1) \rfloor$ $a_3=a_1-q\cdot a_2=(P-(N+1)-\lfloor(p-(N+1))/(N+1)\rfloor(N+1)$ $y_3=y_1+q\cdot y_2=1+\lfloor(p-(N+1))/(N+1)\rfloor\cdot 1=\lfloor p/(N+1)\rfloor$ \quad Eq. 41

Since $a_3$ is not greater than N, the algorithm stops and the denominator of the solution is given by $y_3$.

2.4 Ring Isomorphism of Order-N Farey Fractions

The order-N Farey fractions $\mathbb{C}_p$), in which the elements are scoped as stated in Theorem 8, is a set equipped with two binary operations, addition and multiplication, where $\mathbb{C}_p$ is associative and commutative under addition, and have an additive inverse and additive identity, and is associative and distributive under multiplication, and has a multiplicative identity. All non-zero elements of $\mathbb{C}_p$ has a multiplicative inverse. Addition and multiplication in $\mathbb{C}_p$ are defined as follows:

$\alpha+\beta \in \mathbb{C}_p = H^{-1}(p,H(p,\alpha+\beta))$ $\alpha\beta \in \mathbb{C}_p = H^{-1}(p,H(p,\alpha\beta))$ \quad Eq. 42

Therefore, $\mathbb{C}_p$ is a commutative ring. We want to show that $\mathbb{C}_p$ is isomorphic with Zp. In Theorem 3 we showed that the function H uniquely and correctly maps elements of $\mathbb{C}_p$ to elements of $\mathbb{Z}_p$ and in Theorem 4 we showed that the function $H^{-1}$ uniquely and correctly maps elements of $\mathbb{Z}_p$ to elements of $\mathbb{C}_p$. Now we show the ring isomorphism between $\mathbb{C}_p$ and $\mathbb{Z}_p$ by further examining addition and multiplication.

Lemma 4. For all α, β ∈ $\mathbb{C}_p$ the following holds:

$H(p,\alpha+\beta)=H(p,\alpha)+H(p,\beta)$ $\alpha+\beta=H^{-1}(p,H(p,\alpha+\beta))$ \quad Eq. 43

Proof Given α=a/b, β=c/d ∈ $\mathbb{C}_p$, recall that each Hensel code $h=ab^{-1}$ mod p can be rewritten as a diophantine equation so we can write the Hensel code of α, β, respectively, as:

$h_\alpha=(a-k_\alpha p)/b$ $h_\beta=(c-k_\beta p)/d$ \quad Eq. 44 where $k_\alpha$, $k_\beta$ are given by:

$k_\alpha=(a-bh)/p$ $k_\beta=(c-dh)/p$ \quad Eq. 45

Then, we can write the following:

$$H(p, \alpha) + H(p, \beta) = \frac{a}{b} + \frac{c}{d} - \frac{pk_\alpha}{b} - \frac{pk_\beta}{d} = h_{\alpha+\beta} \quad \text{Eq. 46}$$

We compute $k_{\alpha+\beta}$ as:

$$k_{\alpha+\beta} = ad + bc - bd\frac{\left(\frac{a-k_\alpha p}{p} + \frac{(a-k_\beta p)}{d}\right)}{p} \quad \text{Eq. 47}$$

which allows us to obtain the numerator and denominator of a/b+c/d which is given by computing $H^{-1}$ (p, α+β) and we verify that:

$ad + bc = bdh_{\alpha+\beta} + k_{\alpha+\beta}p$ \quad Eq. 48

$bd = \frac{(ad+bc) - k_{\alpha+\beta}p}{h_{\alpha+\beta}}$

Thus, $H^{-1}(p, h_{\alpha+\beta}) = (ad + bc)/bd = \alpha + \beta$ \quad Eq. 49

Lemma 5. For all α, β ∈ $\mathbb{C}_p$ the following holds:

$H(p,\alpha\beta)=H(p,\alpha)H(p,\beta)$ $\alpha\beta=H^{-1}(p,H(p,\alpha\beta))$ \quad Eq. 50

Proof. For α=a/b, β=c/d ∈ $\mathbb{C}_p$, once again we have:

$H(p,\alpha)=h_\alpha=(a-k_\alpha p)/b$ $H(p,\beta)=h_\beta=(c-k_\beta p)/d$ \quad Eq. 51 where $k_\alpha=(a-bh)/p$ $k_\beta=(c-dh)/p$ \quad Eq. 52

Then we can write the following:

$$H(p, \alpha)H(p, \beta) = \frac{(a-k_\alpha p)(c-k_\beta p)}{bd} = h_{\alpha\beta} \quad \text{Eq. 53}$$

We compute $k_{\alpha\beta}$ as follows:

$$k_{\alpha\beta} = \frac{(ac - (a-k_\alpha p)(c-k_\beta p)}{p} \quad \text{Eq. 54}$$

which allows us to obtain the numerator and denominator of a/b·c/d which is given by computing $H^{-1}(p, \alpha\beta)$ and we verify that:

$$ac = bdh_{\alpha\beta} + k_{\alpha\beta}p \qquad \text{Eq. 55}$$

$$bd = \frac{ac - k_{\alpha\beta}p}{h_{\alpha\beta}}$$

Thus, $$H^{-1}(p, h_{\alpha\beta}) = ac/cd = \alpha\beta \qquad \text{Eq. 56}$$

We define the modulo p operation on elements of $\mathbb{Q}$ as follows:

$$\alpha \bmod p = H^{-1}(p, H(p,\alpha)), \alpha \in \mathbb{C}_N. \qquad \text{Eq. 57}$$

Example 6. Let p=83, and a/b=c/d=5/6∈ $\mathbb{C}_N$. We show that the product:

$$5/6 \cdot 5/6 = 25/36, \qquad \text{Eq. 58}$$

corresponds to:

$$H\left(p, \frac{5}{6} \cdot \frac{5}{6}\right) = H\left(p, \frac{25}{36}\right) = 25 \cdot (36)^{-1} = 25 \cdot 30 = 3 \bmod 83. \qquad \text{Eq. 59}$$

It is easy to verify that since $$H\left(p, \frac{5}{6}\right) = 70,$$

then:

$$70 \cdot 70 = 3 \bmod 83. \qquad \text{Eq. 60}$$

Example 7. Let p=83, and a/b=c/d=6/11∈ $\mathbb{C}_N$. We show that the sum:

$$6/11 + 6/11 = 12/11, \qquad \text{Eq. 61}$$

corresponds to:

$$H\left(p, \frac{6}{11} + \frac{6}{11}\right) = H\left(p, \frac{12}{11}\right) = 12 \cdot (11)^{-1} = 12 \cdot 68 = 69 \bmod 83. \qquad \text{Eq. 62}$$

It is easy to verify that since $$H\left(p, \frac{6}{11}\right) = 76,$$

then:

$$76+76=69 \bmod 83. \qquad \text{Eq. 63}$$

Example 8. What if the computations on elements in $\mathbb{C}_p$ produce a very large result which is way far from $\mathbb{C}_p$? We show that the result, no matter what it is, is congruent modulo p. Let p=83, and a/b=5/9. Then, we show that the following holds:

$$H(83, 5/9 \cdot 5/9 \cdot 5/9) = H\left(p, \frac{5}{9}\right) \cdot H\left(p, \frac{5}{9}\right) \cdot H\left(p, \frac{5}{9}\right) \qquad \text{Eq. 64}$$

where the computation with Hensel codes is reduced modulo 83. We see that:

$$H(83, 5/9 \cdot 5/9 \cdot 5/9) = H(83, 5^3/9^3) = 53 \qquad \text{Eq. 65}$$

and since $$H(83, 5/9) = 19 \qquad \text{Eq. 66}$$

then, $$19^3 = 53 \bmod 83. \qquad \text{Eq. 67}$$

Theorem 9. For any given prime p, there is a ring isomorphism between $\mathbb{C}_p$ and $\mathbb{Z}_p$.

Proof According to Theorems 3 and 4, the function H correctly and uniquely maps each member of $\mathbb{C}_p$ to a member of $\mathbb{Z}_p$ as well as the function $H^{-1}$ correctly and uniquely maps each member of $\mathbb{Z}_p$ to a member of $\mathbb{C}_p$. Lemmas 4 and 5 show that H and $H^{-1}$ preserve this correspondence over addition and multiplication. Thus, there is a one-to-one and onto correspondence between $\mathbb{C}_N$ and $\mathbb{Z}_p$.

2.5 g-Adic Numbers

Definition 6. Let g be a positive integer which is written as the product of k distinct primes such that $g=\Pi_{i=1}^{k} p_i$. A g-adic number has a unique expansion of the form $x = a_0 + a_1 g + a_2 g^2 + \ldots$, where $a_0 \neq 0$ and $0 \leq a_i \leq g$. If we let $a_0 + a_1 g + \ldots + a_i g^i$, then the expansion of a rational number α/b can be computed in terms of g as long as a, h and g are pairwise coprime.

Definition 7. g-adic number forward map Given k distinct prime numbers $p_1, \ldots, p_k$, for k≥1, and a rational number α/b such that:

$$\mathbb{F}_g = \left\{ a/b \in \mathbb{Q}_g \middle| \begin{array}{c} gcd(a, b) = gcd(a, g) = gcd(b, g) = 1 \\ \text{and } a/b \text{ is the first convergent in } \mathbb{C}_{h/g} \text{ such that} \\ 0 \leq |a| \leq N, 0 < |b| \leq \lfloor g/(N+1) \rfloor \end{array} \right\} \qquad \text{Eq. 68}$$

where $$N = \lfloor \sqrt{g/2} \rfloor, g = \prod_{i=1}^{k} p_i, \qquad \text{Eq. 69}$$

the k-digit Hensel code forward mapping is calculated as follows:

$$(h_1, \ldots, h_k) = H_g((p_1, \ldots, p_k), a/b) \qquad \text{Eq. 70}$$
$$= (H(p_1, a/b), \ldots, H(p_k, a/b))$$

We write $(h_1, \ldots, h_k) = H_g((p_1, \ldots, p_k), a/b)$.

Example 9. Given $p_1 = 241, p_2 = 251, p_3 = 281$, a/b=3/5, the multiple direct Hensel code mapping is calculated as follows:

$$(h_1, \ldots, h_k) = H_g((p_1, \ldots, p_k), a/b) \qquad \text{Eq. 71}$$
$$= H_g((241, 251, 281), 3/5)$$
$$= (97, 101, 113)$$

In order to define the g-adic number inverse map we introduce Lemma 6.

Lemma 6. Given an order-N Farey fraction a, k primes $p_1, \ldots, p_k$ and $g = \Pi_{i=1}^{k} p_i$, the k-digit Hensel code $(h_1, \ldots, h_k) = H_g((p_1, p_k), a)$ and the single digit Hensel code h H(g, α) are equivalent since they represent the same quantity a.

Proof. The single most relevant property in any prime p for being used to compute Hensel codes for order-N Farey fractions a is that p does not share any common divisor greater than 1 with any number less than p and therefore a modular multiplicative inverse of any number less than p and p is guaranteed to exist. Given k primes $p_1, \ldots, p_k$, the k-digit Hensel code of a=a/b is computed as (H $(p_1, a), \ldots, H(p_k, a)$). Since the Hensel code direct mapping requires a, h and each $p_i$ to be pairwise coprime and each Hensel code digit $h_i$ is less than each corresponding $p_i$, it is guaranteed that gcd(a,g)=gcd(b, g)=1 for $g=\Pi_{i=1}^{k} p_i$. If we compute $(h_1, \ldots, h_k) = H_g((p_1, \ldots, p_k), \alpha)$, we verify that:

$$\sum_{i=1}^{k} \frac{g}{p_i}\left(\left(\frac{g}{p_i}\right)^{-1} \bmod p_i\right) h_i \bmod g = ab^{-1} \bmod g$$

and thus $$H_g((p_1, \ldots, p_k), \alpha) \equiv H(g, \alpha).$$

Example 10. Let $p_1=241$, $p_2=251$, $p_3=257$, g=241·251·257=15546187 and α=3/5. We compute the 3-digit Hensel code for a as follows:

$$(97,101,52) = H_g((241,251,257), 3/5) \quad \text{Eq. 73}$$

By computing the left-hand side of Eq. 72 we have:

$$(64507 \cdot 119 \cdot 97 + 61937 \cdot 46 \cdot 101 + 60491 \cdot 83 \cdot 52) = 1293442759 \quad \text{Eq. 74}$$

and $$1293442759 \bmod g = 1293442759 \bmod 15546187 = 3109238 \quad \text{Eq. 75}$$

By computing the right-hand side of Eq. 72 we have:

$$3 \cdot 5^{-1} \bmod 15546187 = 3 \cdot 6218475 \bmod 15546187 = 3109238 \quad \text{Eq. 76}$$

which is compliant with Eq. 72.

Definition 8. g-adic number inverse map Given k distinct odd prime numbers $p_1, \ldots, p_k$, and a k-digit Hensel code $(h_1, \ldots, h_k)$, the corresponding rational number α/b is calculated as follows:

$$z = \sum_{i=1}^{k} \frac{g}{p_i}\left(\left(\frac{g}{p_i}\right)^{-1} \bmod p_i\right) h_i \bmod g \quad \text{Eq. 77}$$

where z is computed via the CRT, $g=\Pi_{i=1}^{k} p_i$, and the result a/b is computed as $$\frac{a}{b} = H^{-1}(g, z).$$

We write $a/b = H_g^{-1}((p_1, \ldots, p_k), (h_1, \ldots, h_k))$.

Example 11. Given $p_1=241, p_2=251, p_3=281$ and the Hensel codes $h_1=97$, $h_2=101$, $h_3=113$, we calculate the corresponding rational number α/b as follows:

$$z = \sum_{i=1}^{2} \frac{g}{p_i}\left(\left(\frac{g}{p_i}\right)^{-1} \bmod p_i\right) h_i \bmod g \quad \text{Eq. 78}$$
$$= 6799189$$

and $$a/b = H^{-1}(g, z)$$
$$= H^{-1}(16997971, 6799189)$$
$$= 3/5$$

Theorem 10. Let $(p_1, \ldots, p_k)$ be k distinct primes, and $N = \lfloor \sqrt{g/2} \rfloor$. A k-digit Hensel code encoded in terms of $(p_1, \ldots, p_k)$ is equivalent to a single digit Hensel code encoded in terms of g.

Proof Given k primes $(p_1, \ldots, p_k)$, $N=\lfloor \sqrt{g/2} \rfloor$, $g=\Pi_{i=1}^{k} p_i$, a rational number α/b where a, b, g are pairwise coprimes and a k-digit Hensel code $(h_1, \ldots, h_k) = H_g((p_1, \ldots, p_k), a/b)$, it holds that:

$$\sum_{i=1}^{k} \frac{g}{p_i}\left(\left(\frac{g}{p_i}\right)^{-1} \bmod p_i\right) h_i \bmod g. \quad \text{Eq. 80}$$

It is easy to see that (80) holds if we have a single prime and g=p. Then mod $$\frac{g}{p_i}\left(\left(\frac{g}{p_i}\right)^{-1} \bmod p_i\right) = 1$$

and we gave h mod g left, since we have a single code for a single prime. Thus, $ab^{-1}$ mod g. Another way to see this equivalence is by inspecting the g-adic number inverse map in Definition 8. The first of decoding a k-digit Hensel code is to compute z in Eq. 77. Then, z is decoded as a single Hensel code in terms of g and it is clear that:

$$H(g, a/b) = \sum_{i=1}^{k} \frac{g}{p_i}\left(\left(\frac{g}{p_i}\right)^{-1} \bmod p_i\right) h_i \bmod g.$$

Example 12. Let k=4, $(p_1, p_2, p_3, p_4) = (17, 23, 37, 41)$, $g=\Pi_{i=1}^{k} p_i = 593147$ and a/b=25/11. The 4-digit Hensel code for 25/11 is given by:

$$H_g((17,23,37,41), 25/11) = (10, 19, 9, 6). \quad \text{Eq. 82}$$

In order to decode (10, 19, 9, 6) back to a/b, according to Definition 8, the first step is to compute z via CRT:

$$z = 34891 \cdot 5 \cdot 10 + 25789 \cdot 4 \cdot 19 + 16031 \cdot 26 \cdot 9 + 14467 \cdot 34 \cdot 6 = 323537, \quad \text{Eq. 83}$$

and we check that:

$$H\left(g, \frac{a}{b}\right) = H\left(593147, \frac{25}{11}\right) = 323537. \quad \text{Eq. 84}$$

Theorem 11. A rational number α/b encoded with k distinct primes $(p_1, \ldots, p_k)$ must result in k distinct Hensel digits if a/b is not a positive integer.

Proof Since a, b and $p_i$, for i=1 k are all pairwise coprime, the only way to have non-distinct Hensel digits in $(ab^{-1}$ mod $p_i$, $ab^{-1}$ mod $p_k$) is if $0 \le a \le p_i$ (for all i) and b=1, which indicates that a/b is a positive integer. If a≥0 and b>0, b≠1, then the modular multiplicative inverse of b with respect to $p_i$ is unique, which will result in k distinct Hensel digits. If a<0 and b=1, which indicates that a/b is a negative integer, the modular additive inverse of a with respect to $p_i$ is also unique, resulting in k distinct Hensel digits.

3. Encrypting Rational Numbers

The theory of p-adic numbers is sometimes referred as a theory of representation, mostly for its ability of consistently replacing the arithmetic over rational numbers by the arithmetic over the integers. In some applications, critical data are often represented as fractions, as it is the case of machine learning, where some data need to be normalized and then taken the standard deviation, production values within, say, 0 and 1. In this section we want to demonstrate that some well-known cryptosystems can be slightly modified to include rational numbers in the set of its inputs without adding extra variables or compromising existing homomorphic properties, as it is the case of RSA.

3.1 RSA with Rational Numbers

The RSA clyptosystem can be summarized as follows: given a public key e and two secret prime numbers p and q, a public key n is computed such that n=pq and the private keys $\phi(n)$ and d are computed such that $\phi(n)$ (p−1)(q−1) and $d=e^{-1}$ mod $\phi(n)$, i.e., ed=1 mod $\phi(n)$. Given a message in, a ciphertext c is computed such that c=me mod n. The message m can be retrieved from c such that $m=c^d$ mod n. This is known as the "naive" RSA signatures, which is sufficient for this particular discussion, since we are addressing an extension of RSA's utility without affecting its security. For the secure versions of RSA discussed by Katz and Lindell, such as RSA PKCS and RSA-OAEP, we propose the same basic approach that will be discussed next, that, to consider the message m a rational number and replace it by its corresponding Hensel code h.

RSA operates over the integers. If one wants to use RSA to encrypt any data that is not in integer form, then a mapping from any other format to integer form is required. We show that Hensel codes can be used to solve this problem without compromising RSA properties.

Definition 9. Hensel codes with single existing prime Let $\mathbb{C}_p$ be a set of order-N Farey fractions. Then, p is chosen to encode $\alpha=a/b \in \mathbb{C}_p$ where $N=\lfloor\sqrt{p/2}\rfloor$. The Hensel encoding is given by h=H(p, a/h). The ciphertext c is computed as $c=h^e$ mod n. This scheme preserves the multiplicative homomorphism in the original textbook definition of RSA since p is a factor of n.

Remark 3. According to Definition 9, the message space is reduced from {0, . . . , n−1} to {0, . . . , p−1}.

Remark 4. Because p is needed to encode $m \in \mathbb{Q}$ as $h \in \mathbb{Z}_p$, the encryption scheme is no longer a public-key one, instead, it is a private-key encryption scheme.

Example 13. Let e=17, p=211. q=199, n=41989, $\phi(n)$= 41580 and d=22013. Let a=9/7 be the fraction we want to encrypt. We proceed as follows:

$h=H(p,\alpha)=H(211,9/7)=152$ $c=h^e$ mod $n=152^{17}$ mod $41989=35864$   Eq. 85

Decryption is computed as follows:

$h=c^d$ mod $n=35864^{22013}$ mod $n=152$ $\alpha=H^{-1}(p,h)=9/7$   Eq. 86

Definition 10. Hensel codes with public modulus Let $\mathbb{C}_N$ be a set of order-N Farey fractions for any given $N=\lfloor\sqrt{n/2}\rfloor$. We use n=pq to encode $\alpha=a/b \in \mathbb{C}_N$ so the Hensel encoding is given by $h=ab^{-1}$ mod n. The ciphertext c is computed as $c=h^e$ mod n.

Remark 5. According to Definition 10, the message space size is exactly the same as the standard RSA configuration, that is, |{0, . . . , n−1}|=n.

Remark 6. By using n to encode $m \in \mathbb{Q}$ as $h \in \mathbb{Z}_n$, the encryption scheme remains a public-key encryption scheme.

Example 14. Let e=17, p=211, q=199, n=41989, $\phi(n)$= 41580 and d=22013. Let a=9/7 be the fraction we want to encrypt. We proceed as follows:

$h=H(n,a)=H(41989,9/7)=23995$ $c=h^e$ mod $n=23995^{17}$ mod $41989=15608$   Eq. 87

Decryption is computed as follows:

$h=c^d$ mod $n=15608^{22013}$ mod $n=23995$ $a=H^{-1}(n,h)=9/7$   Eq. 88

Remark 7. The Hensel code function is homomorphic with respect to addition and multiplication. The RSA function is homomorphic with respect to multiplication. Since both functions are homomorphic with respect to multiplication, adding the Hensel code step to the RSA implementation will preserve the multiplicative homomorphism of RSA.

Example 15. Let e=23, p=227, q=173, n=39271, $\phi(n)$= 38872 and d=18591. Let $a_1$=4/5, $a_2$=7/6, and n be used to compute the Hensel code of $a_1$ and $a_2$. We have $h_1$=H(n, $a_1$)=7855 and $h_2$=H(n, $a_2$)=32727. We compute $c_1$ and $c_2$ as $c_1=h_1$ mod n=2415 and $c_2=h_2$ mod n=20018. Let $c_3$ be the product of $c_1$ and $c_2$ such that $c_3=c_1 c_2$ mod n=869. We compute $h_3=c_3^d$ mod n=2619 and $a_3=H^{-1}$ (n, $h_3$)=14/15. We then verify that $a_1 a_2$ 4/5·7/6=14/15=$a_3$.

The methods introduced are particularly interesting if a given encryption scheme is originally designed to work over the integers and is homomorphic with respect to addition and/or multiplication since they allow such encryption scheme to operate also with rational numbers while preserving any existing homomorphism.

4. Adding Randomness to Deterministic Algorithms

In 1984, Goldwasser and Micali introduced a new model of encryption, that is, the probabilistic (or randomized) encryption while remarking its superiority in computational complexity in comparison with its deterministic counterpart. All techniques used to address this problem result in some form of ciphertext expansion.

4.1 Randomized RSA

Once again, we use the RSA cryptosystem illustrate utilities provided by Hensel codes, this time, randomization. Our goal is to modify the RSA scheme in order to add randomization without affecting its multiplicative homomorphism. We propose two versions, one that is a private-key and another that is a public-key encryption scheme.

Definition 11. Let the randomized private-key RSA be defined as follows: given e, p, q, $\phi(n)$, d from the standard RSA configuration, Enc is a probabilistic-polynomial time algorithm that, in order to encrypt a message $m \in \mathbb{Z}_p$, choose a uniform $s \in \{1, \ldots, q-1\}$ compute $H_g^{-1}((p,q),(m,s))$, then h=H(n, a), so the ciphertext c is given by $c=h_e$ mod n.

Dec is a deterministic-polynomial time algorithm that, given a ciphertext c, we compute $a=H^{-1}$ (n, h) in order to retrieve in as m=H(p, a).

Example 16. Let $e=23, p=227$, $q=173$, $n=39271$, $\phi(n)=38872$, $d=18591$, the message $m=16$, and the random number $s=179$. We compute a, h and c as follows: First, we compute a:

$$\alpha = H_g^{-1}(227,173),(16,179))=123/107, \quad \text{Eq. 89}$$

then we compute $h$:

$$h=123\cdot 107^{-1} \bmod 39271 = 123\cdot 19452 \bmod 39271 = 36336. \quad \text{Eq. 90}$$

The ciphertext $c$ is computed as:

$$c=h^e \bmod n = 36336^{23} \bmod 39271 = 20893. \quad \text{Eq. 91}$$

Decryption is computed as follows: we first recover $h$:

$$h=c^d \bmod n = 20893^{18591} \bmod 39271 = 36336, \quad \text{Eq. 92}$$

then we compute $a$:

$$a=H^{-1}(n,h)=H^{-1}(39271,36336)=123/107, \quad \text{Eq. 93}$$

so we can finally recover $m$:

$$m=ab^{-1} \bmod p = 123\cdot 107^{-1} \bmod 39271 = 123\cdot 157 \bmod 227 = 16. \quad \text{Eq. 94}$$

Remark 8. According to Theorem 10, we could simplify the encryption function to be:

$$h=c(q^{-1} \bmod p)p(p^{-1} \bmod q)s$$

$$c=h^e \bmod n \quad \text{Eq. 95}$$

however, in order to keep notation and strategy consistent with the remainder of this work, which include constructions with more than two primes, we favor generalization and express the computations in terms of single and multiple Hensel codes.

Remark 9. The randomization in Definition 11 is given by s. If s is uniformly random in the set $\{1, \ldots, q-1\}$, then there will be $q-1$ possible values for h and c for every message m that is encrypted.

Example 17. Let $p=227$, $q=173$, $n=39271$. If the message $m=23$ and $s=202$, $a=H_g^{-1}((p,q),(m, s))=73/92$ and $h=H(n, \alpha)=17502$, thus $c=h^e \bmod n=20747$. If the same message is accompanied of $s=234$, $a=H_g^{-1}((p,q),(m,s))=67/72$, $h=H(n, \alpha)=19091$, hence $c=h^e \bmod n=6900$.

Definition 12. Let the randomized public-key RSA be defined as follows: given e, p, q, n, $\phi(n)$, d from the standard RSA configuration, and let two additional public primes x, y, xy<n be considered such that:

Enc is a probabilistic-polynomial time algorithm that, in order to encrypt a message $m \in \mathbb{Z}_x$, choose a uniform $s \in \{1 \ldots, y-1\}$ compute $\alpha = H_g^{-l}((x,y),(m,s))$, then $h=H(n, \alpha)$, so the ciphertext c is given by $c=h^e \bmod xyn$.

Dec is a deterministic-polynomial time algorithm such that, given a ciphertext c, we compute $a=H(n, h)$ in order to retrieve m as $m=H(x, \alpha)$.

Remark 10. Since x, y, n are public, only public information is required for encrypting, thus the proposed randomized RSA encryption scheme remains a public-key one and multiplicative homomorphic. If one is not interested in homomorphism, the encryption can be computed as $c=h^e \bmod n$.

Remark 11. Similar to what we discussed in Section 3, we are adding Hensel codes to the RSA recipe as a tool of representation, meaning, we are transforming a deterministic encryption scheme into a probabilistic one by representing a message m together with a random s as a 2-digit Hensel code s), which is then represented as a Farey fraction a. As we discussed in Section 2.5, there is a unique Farey fraction $\alpha$ for each k-digit Hensel code with respect to k primes.

Hardware Implementation for a p-Adic Number Enhanced RSA Cryptosystem Embodiment (FIG. 1)

FIG. 1 is a block diagram 100 of the hardware implementation for a p-adic Number Enhanced RSA Cryptosystem Embodiment. The hardware diagram 100 shown in FIG. 1 applies equally well to embodiments that encrypt rational numbers using p-adic numbers as to embodiments that add randomness using p-adic numbers. A source device 102 is connected over an electronic network/bus connection 106 to a destination device 104. In the embodiment shown in FIG. 1, the source device 102 acts as the source of the encrypted messages of the RSA cryptosystem and the source device 102 sends the encrypted data 108 over the network/bus connection 106 to the destination device 104. The destination device 104 acts as a destination for the encrypted data 108 received from the network/bus connection 106. Generally, communications, including concealed/encrypted communications, are bi-directional such that the source 102 and destination 104 devices may change roles as the encrypted data 108 source and the encrypted data 108 destination as is necessary to accommodate the transfer of data back and forth between the computing devices 102, 104. Additionally, while the computing devices 102, 104 are depicted as separate devices in FIG. 1, the functionality of the source device 102 and the destination device 104 may be shared on a single computing system/device or among two computing devices as it is often desirable to conceal data when transferring data between components of a single device.

Further, as shown in FIG. 1, the source device 102 appears to be a laptop computer and the destination device 104 appears to be a tablet device. Generally, any computing device capable of communication over any form of electronic network or bus communication platform 106 may be one or both of the source 102 and destination 104 computing devices. Additionally, the source 102 and destination 104 computing devices may actually be the same physical computing device communicating over an internal bus connection 106 with itself, but still desiring to encrypt transferred data to ensure that an attacker cannot monitor the internal communications bus 106 to obtain sensitive data communications in an unencrypted format.

Various embodiments may implement the network/bus communications channel 106 using any communications channel 106 capable of transferring electronic data between the source 102 and destination 104 computing devices. For instance, the network/bus communication connection 106 may be an Internet connection routed over one or more different communications channels during transmission between the source 102 and destination 104 devices. Likewise, the network/bus communication connection 106 may be an internal communications bus of a computing device, or even the internal bus of a processing or memory storage Integrated Circuit (IC) chip, such as a memory chip or a Central Processing Unit (CPU) chip. The network/bus communication channel 106 may utilize any medium capable of transmitting electronic data communications, including, but not limited to: wired communications, wireless electromagnetic communications, fiber-optic cable communications, light/laser communications, sonic/sound communications, etc., and any combination thereof of the various communication channels.

The various embodiments may provide the control and management functions detailed herein via an application operating on the source 102 and/or destination 104 computing devices. The source 102 and/or destination 104 computing devices may each be a computer or computer system, or any other electronic devices device capable of performing the communications and computations of an embodiment. The source 102 and/or destination 104 devices may include, but are not limited to: a general-purpose computer, a laptop/portable computer, a tablet device, a smart phone, an industrial control computer, a data storage system controller, a CPU, a Graphical Processing Unit (GPU), an Application Specific Integrated Circuit (ASI), and/or a Field Programmable Gate Array (FPGA). Notably, the first 102 and/or second 104 computing devices may be the storage controller of a data storage media (e.g., the controller for a hard disk drive) such that data delivered to/from the data storage media is always encrypted so as to limit the ability of an attacker to ever have access to unencrypted data. Embodiments may be provided as a computer program product which may include a computer-readable, or machine-readable, medium having stored thereon instructions which may be used to program/operate a computer (or other electronic devices) or computer system to perform a process or processes in accordance with the various embodiments. The computer-readable medium may include, but is not limited to, hard disk drives, floppy diskettes, optical disks, Compact Disc Read-Only Memories (CD-ROMs), Digital Versatile Disc ROMS (DVD-ROMs), Universal Serial Bus (USB) memory sticks, magneto-optical disks, ROMs, random access memories (RAMs), Erasable Programmable ROMs (EPROMs), Electrically Erasable Programmable ROMs (EEPROMs), magnetic optical cards, flash memory, or other types of media/machine-readable medium suitable for storing electronic instructions. The computer program instructions may reside and operate on a single computer/electronic device or various portions may be spread over multiple computers/devices that comprise a computer system. Moreover, embodiments may also be downloaded as a computer program product, wherein the program may be transferred from a emote computer to a requesting computer by way of data signals embodied in a carrier wave or other propagation medium via a communication link (e.g., a modem or network connection, including both wired/cabled and wireless connections).

Operational Flow Chart for Concealing and Recovery for an Embodiment (FIG. 2)

FIG. 2 is a flow chart 200 of a p-adic number enhanced RSA cryptosystem embodiment for encrypting rational numbers. It should be noted that an RSA cryptosystem has a public key e, two secret prime numbers p and q, a public key n such that n=pq, and the private keys $\phi(n)$ and d that are computed as $\phi(n)=(p-1)(q-1)$ and $d=e^{-1}$ mod $\phi(n)$. At process 206, the source computing device 202 encodes a rational number $\alpha$ using p-adic based integer Hensel encoding as a function of a Hensel encoding value v and the rational number $\alpha$ to obtain integer Hensel code h. Rational number a is comprised of a fraction a/b with numerator a and denominator b, where the numerator a, denominator b, and the Hensel encoding value v are pairwise coprime, and where an absolute value of said numerator a and denominator h are less than said Hensel encoding value v. Various embodiments may use the secret prime number p for the Hensel encoding value v, which necessitates that the RSA cryptosystem be a private-key encryption system since the secret prime number p is needed to encode and decode the Hensel code and secret prime number p is no longer secret. Alternatively, various embodiments may use public key n for the Hensel encoding value v, which allows the RSA cryptosystem to remain a public-key encryption system since public key n is already a public value.

At process 208, the source computing device 202 encrypts the integer Hensel code h using RSA cryptosystem encryption processes to obtain ciphertext c. At process 210, the source computing device 202 sends the ciphertext c to the destination computing device 204. At process 212, the destination computing device 204 decrypts ciphertext c using RSA decryption processes to obtain the integer Hensel code h. At process 214, the destination computing device 204 decodes integer Hensel code h using an Extended Euclidean Algorithm (EEA) as a function of the Hensel encoding value v and the Hensel code h to obtain the corresponding rational number $\alpha$. It is also worth noting that since the p-adic are additive and multiplicative homomorphic, the multiplicative homomorphism of the RSA cryptosystem is maintained.

Figure 3:
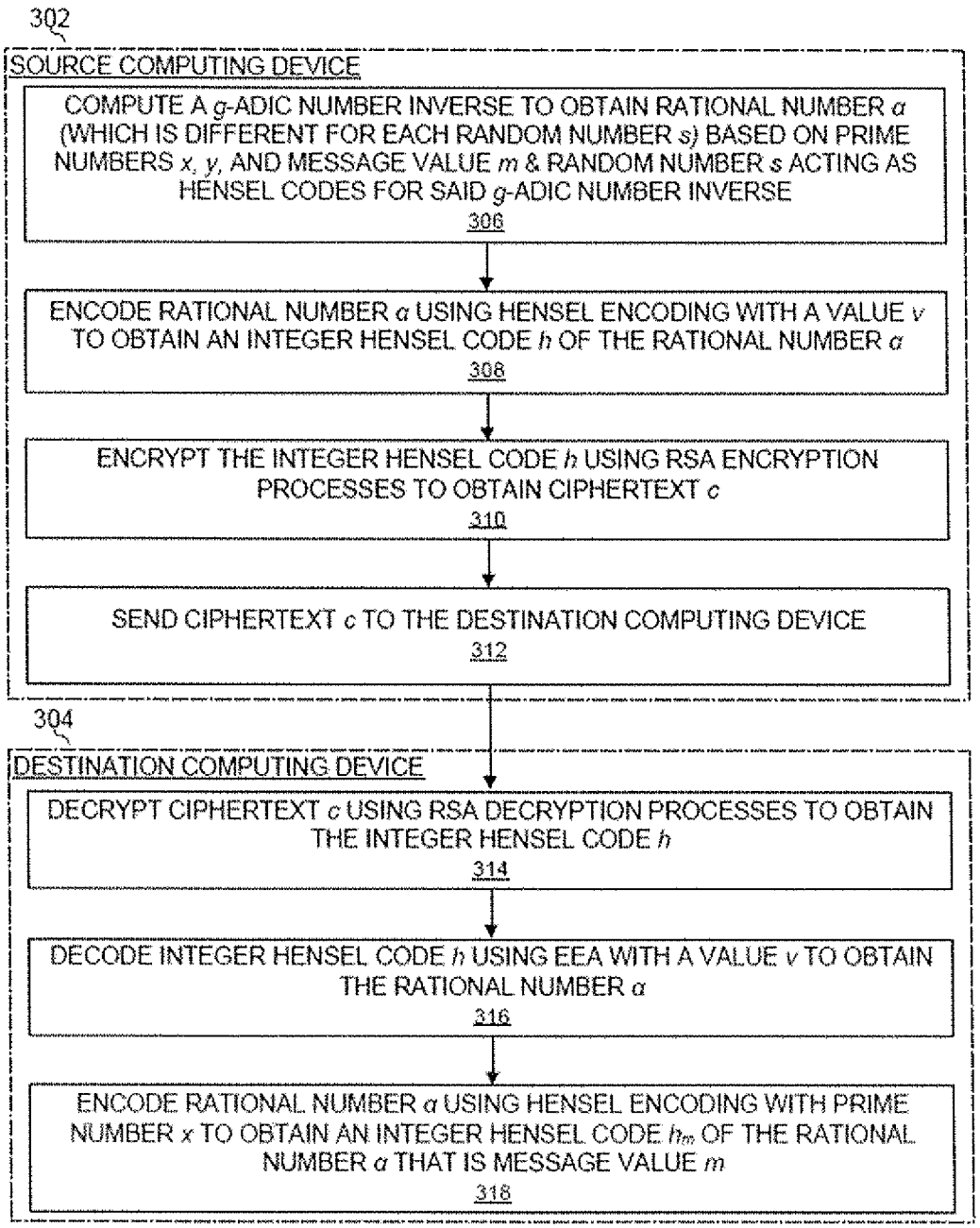
FIG. 3 is a flow chart of a p-adic number enhanced RSA cryptosystem embodiment for randomizing ciphertext values.

Operational Flow Chart for Concealing and Recovery for an Embodiment (FIG. 3)

FIG. 3 is a flow chart 300 of a p-adic number enhanced RSA cryptosystem embodiment for randomizing ciphertext values. Again, it should be noted that an RSA cryptosystem has a public key e, two secret prime numbers p and q, a public key n such that n=pq, and the private keys $\phi(n)$ and d that are computed as $\phi(n)=(p-1)(q-1)$ and $d=e^{-1}$ mod $\phi(n)$. At process 306, the source computing device 302 computes a g-adic number inverse $H_g^{-1}$ as a function of a first prime number x and a second prime number y acting as prime numbers for the g-adic number inverse $H_g^{-1}$, and the message value in and a random number s acting as Hensel codes for the g-adic number inverse $H_g^{-1}$ to obtain rational number $\alpha$, where the random number s is changed for each subsequent encryption operation and the rational number $\alpha$ comprised of a fraction a/b with numerator a and denominator b, and such that the rational number $\alpha$ is different for each different random number s in the subsequent encryption operations for the message value 112 that does not change so as to randomize a ciphertext value c based on the rational number $\alpha$ that changes as the random number s is changed even when the message value in remains constant. For various embodiments, the first prime number x is the secret prime number p and the second prime number y is the secret prime number q. When using the secret prime numbers p, q, the RSA cryptosystem is necessarily a private-key encryption system since the secret prime number p is needed to recover the message value m, but the multiplicative homomorphism of the RSA cryptosystem is maintained without any additional operations being require. For other embodiments, the first and second prime numbers x, y are additional prime numbers separate from the secret prime numbers p, q, so the RAS cryptosystem remains a public-key encryption system, but the multiplicative homomorphism may be lost without a change to the RSA cryptosystem operations. To retain the multiplicative homomorphism of the RSA cryptosystem the RSA encryption processes should be modified such that ciphertext c is calculated as $c=h^e$ mod xyn rather than $c=h^e$ mod n.

At process 308, the source computing device 302 encodes the rational number $\alpha$ using p-adic based integer Hensel encoding as a function of the public key n and the rational number $\alpha$ to obtain integer Hensel code h. At process 310, the source computing device 302 Encrypts the integer Hensel code h using RSA cryptosystem encryption processes to obtain ciphertext c. At process 312, the source computing device 302 sends the ciphertext c to the destination computing device 304. At process 314, the destination computing device decrypts ciphertext c using RSA decryption processes to obtain the integer Hensel code h. At process 316, the destination computing device 304 decodes the integer Hensel code h using an Extended Euclidean Algorithm (EEA) as a function of the public key n and the Hensel code h to obtain the corresponding rational number α. At process 318, the destination computing system 304 encodes the rational number α using p-adic based integer Hensel encoding as a function of the first prime number x and the rational number α to obtain message value m that is a Hensel code of the rational number α.

The foregoing description of the invention has been presented for purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated.

What is claimed is:

1. A computer implemented method for encrypting a rational number α with a RSA (Rivest-Shamir-Adleman) cryptosystem for communication between a source device and a destination device over a network, wherein said RSA cryptosystem has a public key e, two secret prime numbers p and q, a public key n such that n=pq, and the private keys $\phi(n)$ and d that are computed as $\phi(n)=(p-1)(q-1)$ and $d=e^{-1}$ mod $\phi(n)$, the method comprising:
   encoding, by said source device, said rational number α using p-adic based integer Hensel encoding as a function of a Hensel encoding value v, and said rational number α to obtain integer Hensel code h, where said rational number α is comprised of a fraction a/b with numerator a and denominator b, where said numerator a, said denominator b, and said Hensel encoding value v are pairwise coprime, and where an absolute value of said numerator a and said denominator b are less than said Hensel encoding value v;
   encrypting, by said source device, said integer Hensel code h using RSA cryptosystem encryption processes to obtain ciphertext c;
   sending, over the network by said source device, said ciphertext c to said destination device;
   decrypting, by said destination device, said ciphertext c using RSA decryption processes to obtain said integer Hensel code h; and
   decoding, by said destination device, said integer Hensel code h using an Extended Euclidean Algorithm (EEA) as a function of said Hensel encoding value v and said Hensel code h to obtain said corresponding rational number α.

2. The computer implemented method of claim 1, wherein said Hensel encoding value v is said secret prime number p, such that said RSA cryptosystem is a private-key encryption system since secret prime number p is needed to encode and decode said Hensel code h.

3. The computer implemented method of claim 1, wherein said Hensel encoding value v is said public key n, such that said RSA cryptosystem remains a public-key encryption system since public key n needed to encode and decode said Hensel code h is already public.

4. The computer implemented method of claim 1, wherein multiplicative homomorphism of said RSA cryptosystem is retained as Hensel encoding is also multiplicative homomorphic.

5. An RSA (Rivest-Shamir-Adleman) cryptosystem that encrypts a rational number α for communication between an electronic source device and an electronic destination device over a network, wherein said RSA cryptosystem has a public key e, two secret prime numbers p and q, a public key n such that n=pq, and the private keys $\phi(n)$ and d that are computed as $\phi(n)=(p-1)(q-1)$ and $d=e^{-1}$ mod $\phi(n)$, the RSA cryptosystem comprising:
   said electronic source device, wherein said electronic source device comprises:
      a source processor;
      a Hensel code encoding subsystem, being implemented by the source processor, that encodes device said rational number α using p-adic based integer Hensel encoding as a function of a Hensel encoding value v and said rational number α to obtain integer Hensel code h, where said rational number α is comprised of a fraction a/b with numerator a and denominator b, where said numerator a, said denominator b, and said Hensel encoding value v are pairwise coprime, and where an absolute value of said numerator a and said denominator b are less than said Hensel encoding value v;
      an encryption subsystem, being implemented by the source processor, that encrypts said integer Hensel code h using RSA cryptosystem encryption processes to obtain ciphertext c; and
      a send subsystem, being implemented by the source processor, that sends said ciphertext c to said electronic destination device; and
   said electronic destination device, wherein said electronic destination device comprises:
      a destination processor;
      a decryption subsystem, being implemented by the destination processor, that decrypts said ciphertext c using RSA decryption processes to obtain said integer Hensel code h; and
      a Hensel code decode subsystem, being implemented by the destination processor, that decodes said integer Hensel code h using an Extended Euclidean Algorithm (EEA) as a function of said Hensel encoding value v and said Hensel code h to obtain said corresponding rational number α.

6. The RSA cryptosystem of claim 5, wherein said Hensel encoding value v is said secret prime number p, such that said RSA cryptosystem is a private-key encryption system since secret prime number p is needed to encode and decode said Hensel code h.

7. The RSA cryptosystem of claim 5, wherein said Hensel encoding value v is said public key n, such that said RSA cryptosystem remains a public-key encryption system since public key n needed to encode and decode said Hensel code h is already public.

8. The RSA cryptosystem of claim 5, wherein multiplicative homomorphism of said RSA cryptosystem is retained as Hensel encoding is also multiplicative homomorphic.

\* \* \* \* \*